United States Patent
Evans

(10) Patent No.: US 7,510,647 B2
(45) Date of Patent: Mar. 31, 2009

(54) MOBILE FLUID CATALYTIC CRACKING INJECTION SYSTEM

(75) Inventor: Martin Evans, Tolland, CT (US)

(73) Assignee: Intercat Equipment, Inc., Manasquan, NJ (US)

(*) Notice: Subject to any disclaimer, the term of this patent is extended or adjusted under 35 U.S.C. 154(b) by 783 days.

(21) Appl. No.: 10/717,249

(22) Filed: Nov. 19, 2003

(65) Prior Publication Data
US 2005/0103684 A1   May 19, 2005

(51) Int. Cl.
*C10G 35/14* (2006.01)
*C10G 35/24* (2006.01)
*F27B 15/08* (2006.01)

(52) U.S. Cl. .................. 208/152; 422/145
(58) Field of Classification Search .......... 208/113, 208/152; 222/141; 422/139, 145, 219, 239, 422/297, 300
See application file for complete search history.

(56) References Cited

U.S. PATENT DOCUMENTS

| | | | |
|---|---|---|---|
| 2,616,591 A * | 11/1952 | Haugen ................ 222/141 |
| 3,212,657 A * | 10/1965 | Murfitt et al. ............ 414/512 |
| 3,860,510 A * | 1/1975 | Henke et al. ............ 208/89 |
| 3,893,905 A * | 7/1975 | Fenske et al. ............ 203/87 |
| 4,082,513 A * | 4/1978 | Andon et al. ............ 208/152 |
| 4,660,881 A | 4/1987 | Komeya et al. |
| 4,769,127 A * | 9/1988 | Erickson et al. ............ 208/58 |
| 4,782,427 A | 11/1988 | Marks |
| 4,809,889 A | 3/1989 | Friedman |
| 5,055,176 A | 10/1991 | Herbst et al. |
| 5,286,370 A | 2/1994 | Chu et al. |
| 5,389,236 A | 2/1995 | Batholic et al. ............ 208/152 |
| 5,401,387 A * | 3/1995 | Harandi et al. ............ 208/74 |
| 5,810,045 A | 9/1998 | Evans ............ 137/312 |
| 6,132,157 A * | 10/2000 | Comardo ............ 414/160 |
| 6,358,401 B1 | 3/2002 | Evans ............ 208/152 |
| 6,974,559 B2 | 12/2005 | Evans |
| 7,223,714 B2 * | 5/2007 | Beech et al. ............ 502/214 |
| 2001/0041117 A1 | 11/2001 | Comardo |
| 2004/0166032 A1 | 8/2004 | Evans |

OTHER PUBLICATIONS

"IMS to Control Room", Dwg S-29, Sheet 1, Intercat, Savannah, Georgia, Nov. 26, 2001.
PCT International Search Report for PCT/US04/37865 dated Mar. 16, 2006.
"IMS to Control Room", Dwg. S-29, Sheet 1, Intercat, Savannah, Georgia. Nov. 26, 2001.

* cited by examiner

*Primary Examiner*—Glenn Caldarola
*Assistant Examiner*—Randy Boyer
(74) *Attorney, Agent, or Firm*—Tanzina Chowdhury; Patterson & Sheridan, LLP

(57) ABSTRACT

A mobile fluid cracking catalyst injection system and a method of controlling a fluid catalyst cracking process is provided. In one embodiment, a mobile fluid catalyst cracking system includes a transportable platform, a catalyst reservoir coupled to the platform and a flow control device coupled to an outlet of the reservoir and adapted to control the flow of catalyst from the reservoir to a fluid catalyst cracking unit (FCCU).

35 Claims, 13 Drawing Sheets

MOBILE FLUID CATALYTIC CRACKING INJECTION SYSTEM

BACKGROUND OF THE INVENTION

1. Field of the Invention

Embodiments of the invention generally relate to a transportable (i.e., mobile) fluid cracking catalyst injection system.

2. Background of the Related Art

Fluid catalyst cracking units (FCCU) are commonly used in petroleum refining to break long chain hydrocarbons present in crude oil and to adjust the product mix recovered at the distiller. A main catalyst is generally introduced into the FCCU by a catalyst injection system which periodically meters out catalyst for injection over a predefined period of time. Such injection systems are available from Intercat, Inc., located in Sea Girt, N.J. Other examples of conventional injection systems are described in U.S. Pat. No. 5,389,239, issued Feb. 14, 1995, which is incorporated by reference in its entirety.

In addition to the main catalyst, it is often beneficial to inject other catalysts into the FCCU to further influence the refining process. For example, some catalyst are formulated to control certain types of emissions, such as the amount of sulfur- and nitrogen-containing compounds present in refinery emissions. Other catalysts may be formulated to influence the product mix recovered in the distiller. For example, catalyst may be formulated to produce more diesel fuel relative to gasoline or to increase the amount of liquid petroluem gas produced, among others.

FIG. 1 is a simplified schematic of one embodiment of a conventional fluid catalytic cracking system 130. The fluid catalytic cracking system 130 generally includes a fluid catalytic cracking (FCC) unit 110 hard piped to a catalyst injection system 100, an oil feed stock source 104, an exhaust system 114 and a distillation system 116. One or more catalysts from the catalyst injection system 100 and oil from the oil feed stock source 104 are delivered to the FCC unit 110, The oil and catalysts are combined to produce an oil vapor that is collected and separated into various petrochemical products in the distillation system 116. The exhaust system 114 is coupled to the FCC unit 110 and is adapted to control and/or monitor the exhausted byproducts of the fluid cracking process.

The catalyst injection system 100 includes a main catalyst source 102 and one or more additive sources 106. The main catalyst source 102 and the additive source 106 generally mounted on a concrete foundation or pad 180 and are hard piped to the FCC unit 110 by a process line 122. A fluid source, such as a blower or air compressor 108, is coupled to the process line 122 and provides pressurized fluid, such as air, that is utilized to carry the various powdered catalysts from the sources 102, 106 through the process line 122 and into the FCC unit 110.

A controller 120 is utilized to control the amounts of catalysts and additives utilized in the FCC unit 110. Typically, different additives are provided to the FCC unit 110 to control the ratio of product types recovered in the distillation system 116 (i.e., for example, more LPG than gasoline) and to control the composition of emissions passing through the exhaust system 114, among other process control attributes.

As these injection systems are typically supported on a separate foundation and hard pipe connected to the FCC unit, the flexibility of the refiner to rapidly add an additional catalyst injection system is very limited. For example, the time required to plan and install a new catalyst injection system may prevent the refiner from taking advantage of market conditions favorable to a certain product mix not achievable using catalyst injection systems currently coupled to the FCCU. The difficulty in providing quick process adjustment through the injection of additional catalyst in a new catalyst injection system also hampers the ability of the refiner to quickly adjust refinery emissions due to changes in regulations, differences in the chemical make-up of crude oil or process equipment failure. Furthermore, as catalyst injection systems are expensive to install, it is undesirable to have unused catalyst injection systems stationed online as a precaution against any unanticipated need for process control.

Therefore, there is a need for a catalyst injection system which enhances process flexibility.

SUMMARY OF THE INVENTION

Embodiments of the invention generally relate to a fluid cracking catalyst injection system which is easily transportable and integratable with a fluid cracking catalyst unit (FCCU), thereby enabling a refiner to utilize additional types of catalyst for process control on short notice. In one embodiment, a fluid catalyst injection system includes a platform, a catalyst reservoir coupled to a platform and having a catalyst flow control device coupled to an outlet of the reservoir, wherein the platform, reservoir and flow control device are transportable as a unit. In alternative embodiments, the platform may comprise a trailer, a barge, a ship, a pallet, a railcar or a container, and the like.

In another embodiment, a method for process control of a fluid catalyst cracking unit is provided. In one embodiment, a method for controlling a fluid catalyst cracking unit includes transporting a catalyst injection system comprising a platform, a catalyst reservoir coupled to the platform and a flow control device adapted to control the flow from the catalyst reservoir through an outlet of the catalyst reservoir to an operational refinery having at least one fluid catalyst cracking unit; coupling the metering device to the FCC unit and injecting catalyst into the FCC unit. In alternative embodiments, the step of transporting may comprise at least one of transporting by road, transporting by rail, transporting by air and transporting by sea.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
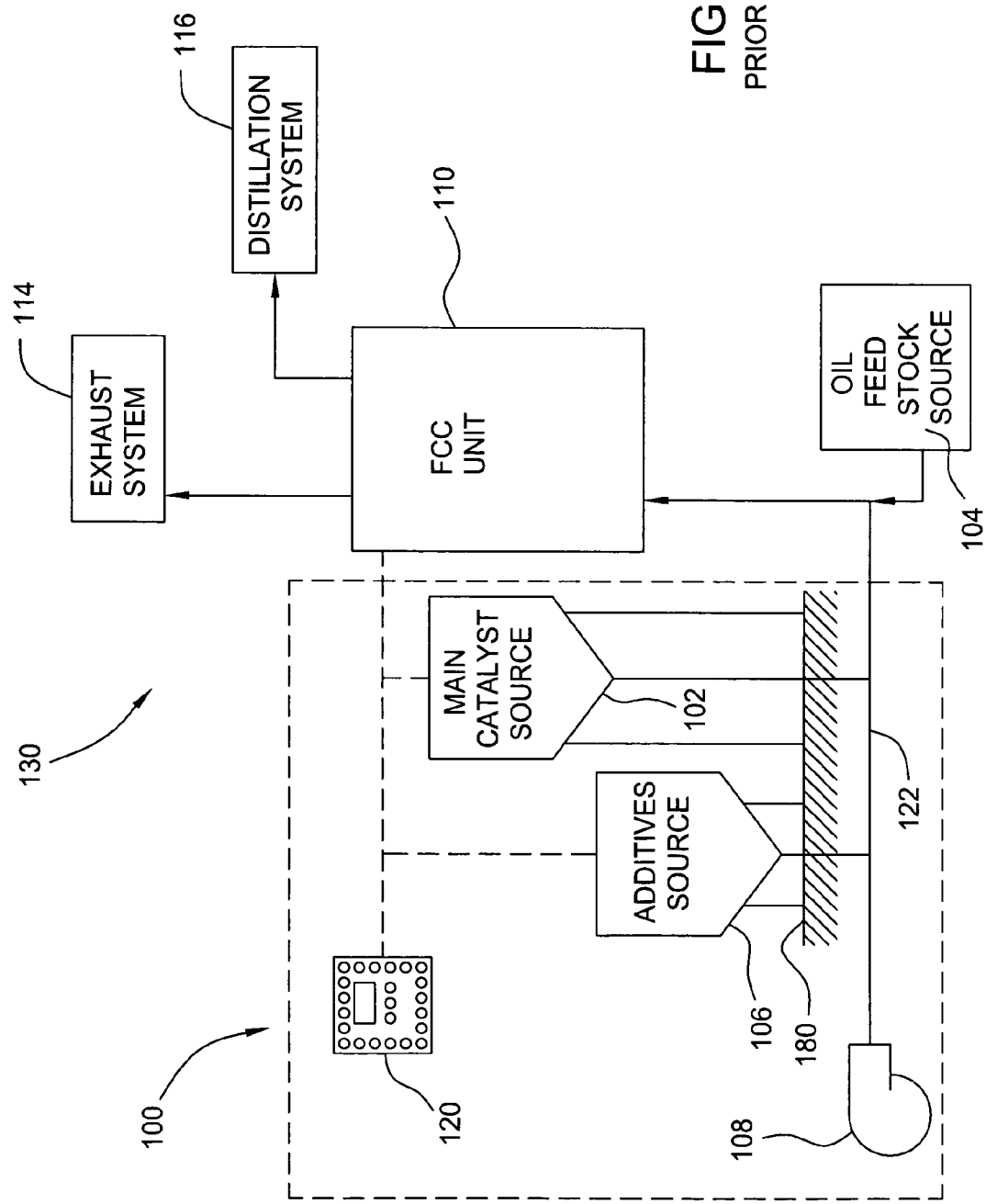
FIG. 1 is a simplified schematic of one embodiment of a conventional fluid catalytic cracking system.
Figure 2:
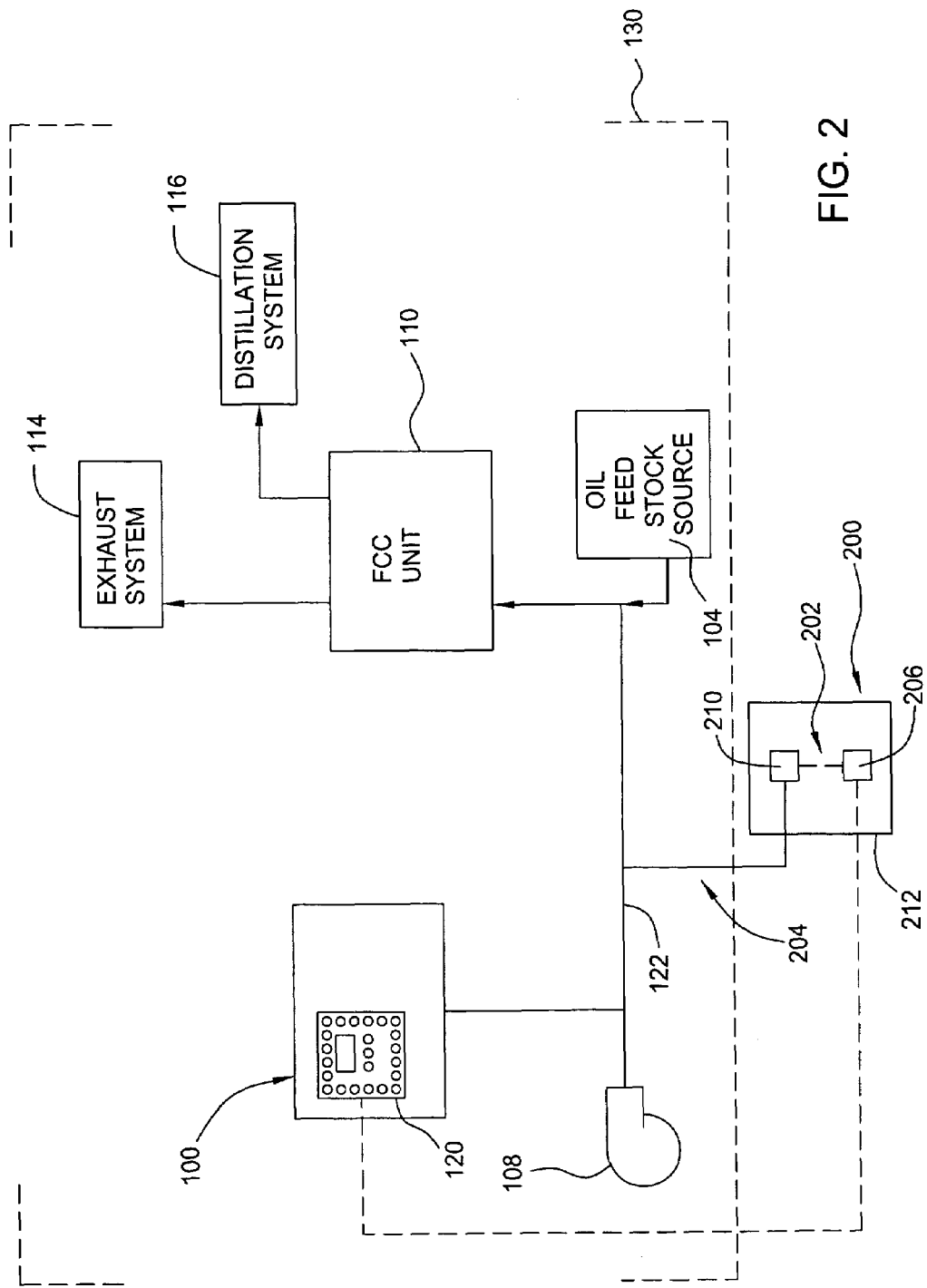
FIG. 2 is a simplified schematic of a fluid catalytic cracking system having one embodiment of a mobile catalyst injection system coupled thereto.

FIG. 2 is a simplified schematic of a conventional fluid catalytic cracking system 130 having one embodiment of mobile catalyst injection system 200 coupled thereto. The mobile catalyst injection system 200 is configured to be easily transportable over great distances thereby enabling the mobile catalyst injection system 200 to be shipped and coupled to an existing fluid catalytic cracking system 130 on short notice. Additionally, the modular aspects of the mobile catalyst injection system 200 also enables the mobile catalyst injection system 200 to be decoupled from one fluid catalytic cracking system, transported, and coupled to another fluid catalytic cracking system with minimal effort. Thus, the mobile catalyst injection system 200 enables a refiner to configure a working refinery with addition catalyst injection systems with minimal lead time, thereby providing the process control flexibility required to quickly take advantage of market opportunities and address unplanned events requiring process change, such as limiting emissions through catalyst reactions.

The mobile catalyst injection system 200 includes a catalyst injection module 210 mounted to a transportable platform 212. The catalyst injection module 210 generally includes a catalyst storage vessel and a dispense system, discussed further in the embodiments described below, and is coupled by a conduit 204 to the process line 122 to deliver catalyst to the FCC unit 110. The conduit 204 may be a flexible process pipe, a temporary process pipe, or a hard pipe.

The mobile catalyst injection system 200 may optionally include a controller 206 to control the dispense of catalyst delivered from the catalyst injection module 210 to the FCC unit 110. The controller 206 may be coupled to a controller 120 of the fluid catalytic cracking system 130 to coordinate catalyst injections and exchange data. Alternatively, the controller 206 may control the injection of catalyst from the mobile catalyst injection system 200 in a stand-along configuration. It is also contemplated that the mobile catalyst injection system 200 may be controlled by the controller 120 of the fluid catalytic cracking system 130.

Figure 3:
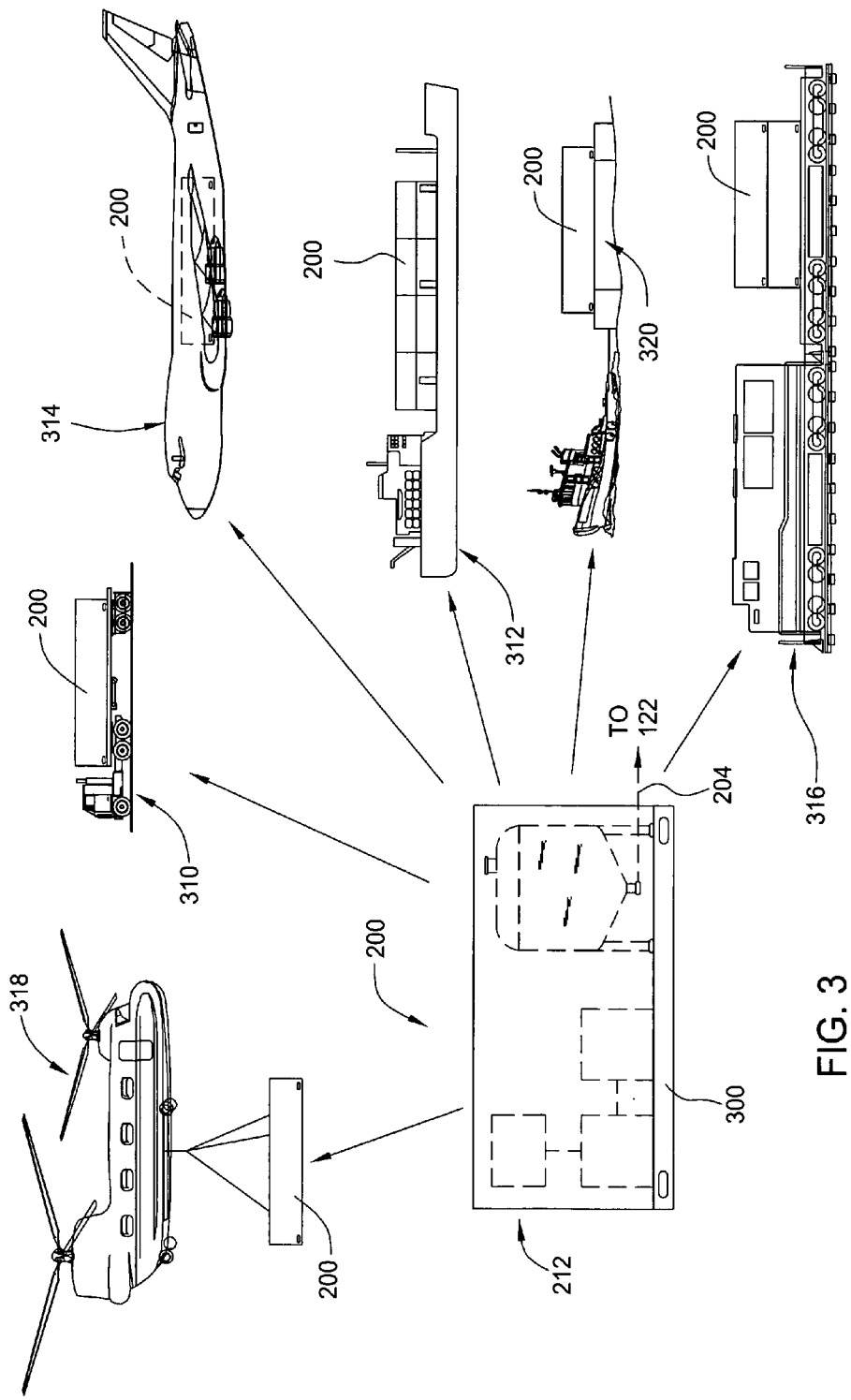
FIG. 3 is a side view of one embodiment of the mobile catalyst injection system of FIG. 2.

The transportable platform 212 is generally configured to support the catalyst injection module 210 and associated components. The transportable platform 212 may be mounted to a foundation 130 at the fluid catalytic cracking system 130, or be disposed adjacent thereto. The transportable platform 212 is configured to facilitate shipment of the mobile catalyst injection system 200 by conventional means, e.g., road, air, sea or rail. For example in an embodiment depicted in FIG. 3, the mobile catalyst injection system 200 has a transportable platform 212 in the form of a container 300, which allows for rapid delivery of the mobile catalyst injection system 200 by conventional means, for example, by truck 310, ship 312, plane 314, train 316, helicopter 318, barge 320 and the like. It is also contemplated the transfer platform 212 may be integrally part of a trailer, barge, ship, plane, truck, rail car and the like. The ease of transporting the platform 212 advantageously allows the mobile catalyst injection system 200 to be coupled and begin injecting catalyst to the FCC unit 110 within a matter of hours or even as little as less than one hour, compared with the several days required to install a conventional permanent or semi-permanent injection system, which is substantially less than the time required to ship, assembly and install a conventional injection system.

Figure 4:
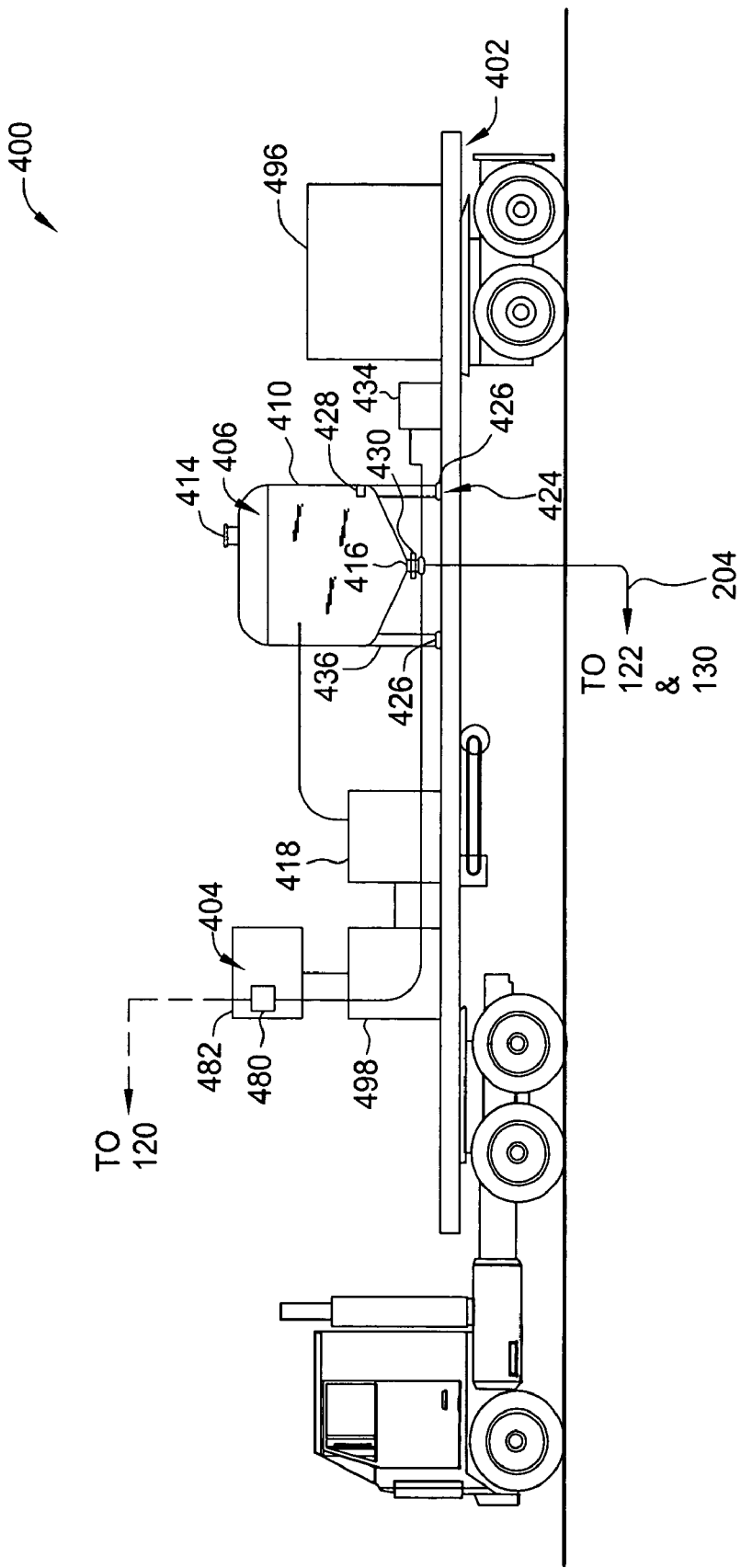
FIG. 4 is a side view of another embodiment of a mobile catalyst injection system.

FIG. 4 depicts another embodiment of a mobile catalyst injection system 400. The mobile catalyst injection system 400 includes a platform in the form of a trailer 402 that supports an injection module 406 and a control module 404. Optionally, the trailer 402 may accommodate a generator 498, a pressure control apparatus 418 and a fluid source 434 that provides power and fluid control for the mobile catalyst injection system 400. However, it is contemplated that power and fluid control for the mobile catalyst injection system 400 may alternatively be obtained from the facility upon installation of the system 400.

Optionally, the trailer 402 may be configured to allow space for a container 496 of catalyst. The container 496 may be one or more drums, supersacks, bins, or totes). Thus, the mobile catalyst injection system 400 may be delivered to a facility with catalyst on-board, thereby ensuring the system 400 is quickly ready for use once integration of the mobile catalyst injection system 400 with the FCCU is complete.

The injection module 406 is coupled to the FCC unit 110 by a conduit 204 as described above and is configured to inject one or more catalysts into the FCC unit 110 to control processing attributes such as the ratio of products recovered in a distiller of the FCC unit 110 and/or to control the emissions from the FCC unit 110. The control module 404 is coupled to the injection module 406 to control the rates and/or amounts of catalyst provided to the FCC unit 110 by the injection module 406.

In one embodiment, the injection module 406 includes a storage vessel 410 coupled to a metering device 412. The metering device 412 is typically coupled to the control module 404 so that an amount of catalyst delivered to the FCC unit 110 may be monitored or metered. Exemplary injection systems that may be adapted to benefit from the invention are described in U.S. Pat. No. 5,389,236, issued Feb. 14, 1995, and in U.S. Pat. No. 6,358,401, issued Mar. 19, 2002, both of which are hereby incorporated by reference in their entireties. Other catalyst injection systems that may be adapted to benefit from the invention are available from Intercat, Inc., headquartered in Sea Girt, N.J., USA.

The storage vessel 410 is typically a metal container mounted to the trailer 402. The storage vessel 410 includes a fill port 414 and a discharge port 416. Typically, the discharge port 416 is positioned at or near a bottom of the storage vessel 410. The size of the storage vessel 410 is generally selected based on shipping considerations. For example, the storage vessel 410 configured to mount on a trailer 402 is limited by road regulations and routing requirements (e.g., overpasses, etc.), while another storage vessel configured for mounting to a barge may be larger.

The storage vessel 410 is coupled to the pressure control apparatus 418 that controls the pressure within the storage vessel 410. The pressure control apparatus 418 generally pressurizes the storage vessel 410 to about 5 to about 80 pounds per square inch (about 0.35 to about 5.6 kg/cm$^2$) during dispensing operations. The apparatus 418 intermittently vents the storage vessel 410 to about atmospheric pressure to accommodate recharging the vessel 410 with catalyst. The pressure control apparatus 418 may include a pump or utilize facility air. In one embodiment, the pressure control apparatus 418 includes a pump that may be powered by the generator 498 or electric power provided by the facility.

The metering device 412 is coupled to the discharge port 416 to control the amount of catalyst injected from the storage vessel 410 to the FCC unit 110. The metering device 412 may be a shut-off valve, a rotary valve, a mass flow controller, a shot pot, a flow sensor, a positive displacement pump or other devices suitable for regulating the amount of catalyst dispensed from the storage vessel 410 for delivery to the FCC unit 110. The metering device 412 may determine the amount of catalyst by weight, volume, timed dispense or by other manners. Depending on the catalyst requirements of the system 100, the metering device 412 is typically configured to provide about 5 to about 4000 pounds per day of additive-type catalysts (process control catalyst). The metering device 412 typically delivers catalysts over the course of a planned production cycle, typically 24 hours, in multiple shots of predetermined amounts spaced over the production cycle. However, catalysts may also be added in an "as needed" basis.

In the embodiment depicted in FIG. 4, the metering device 412 is a control valve that regulates the amount of catalyst delivered from the storage vessel 410 to the FCC unit 110 by a timed actuation. The control valve generally includes a first port that is coupled to the discharge port 416 of the storage vessel 410. A second port of the control valve is coupled to a portion of the conduit 204 leading from the fluid source 434, such as a blower or compressor. A third port of the control valve is coupled to a portion of the conduit 204 leading to the FCC unit 110. When actuated to an open position, the control valve allows catalyst to flow from the storage vessel 410 towards the third port, where fluid provided from the fluid source 434, moving from the second port towards the third port entrains and carries the catalyst to the FCC unit 110. In one embodiment, the fluid source 434 provides air at about 80 psi (about 5.6 kg/cm$^2$). One suitable control valve is described in U.S. patent application Ser. No. 10/304,670, filed Nov. 26, 2002, which is incorporated by reference in it entirety.

The injection module 406 may also include one or more sensors 424 for providing a metric suitable for resolving the amount of catalyst passing through the metering device 412 during each injection of catalyst. The sensors 424 may be configured to detect the level (i.e., volume) of catalyst in the storage vessel 410, the weight of catalyst in the storage vessel 410, the rate of catalyst movement through the storage vessel 410, discharge port 416, metering device 412 and/or catalyst conduit 204 or the like.

In the embodiment depicted in FIG. 4, the sensor 424 is a plurality of load cells 426 adapted to provide a metric indicative of the weight of catalyst in the storage vessel 410. The load cells 426 are respectively coupled to a plurality of legs 436 that supports the storage vessel 410 above the trailer 402. Each of the legs 436 has one load cell 426 coupled thereto. The control module 404 receives the outputs of the load cells 426. From sequential data samples obtained from the load cells 426, the control module 404 may resolve the net amount of injected catalyst after each actuation of the metering device 412. Additionally, the net amount of catalyst dispensed over the course of the production cycle may be monitored so that variations in the amount of catalyst dispensed in each individual shot may be compensated for by adjusting the delivery attributes of the metering device 412, for example, changing the open time of the control valve to allow more (or less) catalyst to pass therethrough and into the FCC unit 110.

Alternatively, the sensor 424 may be a level sensor 428 coupled to the storage vessel 410 and adapted to detect a metric indicative of the level of catalyst within the storage vessel 410. The level sensor 428 may be an optical transducer, a capacitance device, a sonic transducer or other device suitable for providing information from which the level or volume of catalyst disposed in the storage vessel 410 may be resolved. By utilizing the sensed differences in the levels of catalyst disposed within the storage vessel 410 between dispenses, the amount of catalyst injected may be resolved for a known storage vessel geometry.

Alternatively, the sensor 424 may be a flow sensor 430 adapted to detect the flow of catalyst through one of the components of the catalyst injection module 406. The flow sensor 430 maybe a contact or non-contact device and may be mounted to the storage vessel 410, the metering device 412 or the catalyst conduit 204 coupling the storage vessel 410 to the FCC unit 110. In the embodiment depicted in FIG. 4, the flow sensor 430 may be a sonic flow meter or capacitance device adapted to detect the rate of entrained particles (i.e., catalyst) moving through the conduit 204.

The control module 404 generally includes a controller 480 housed in an enclosure 482 that is suitable for service in hazardous locations. In one embodiment, the enclosure 482 is fabricated in accordance with NEC 500 Division 1, Class 1, or other similar standard. One suitable control module is described in previously incorporated U.S. patent application Ser. No. 10/304,670.

The controller 480 may be any suitable logic device for controlling the operation of the catalyst injection module 406 and managing data provided by the sensors 424. In one embodiment, the controller 480 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 480.

Figure 5A:
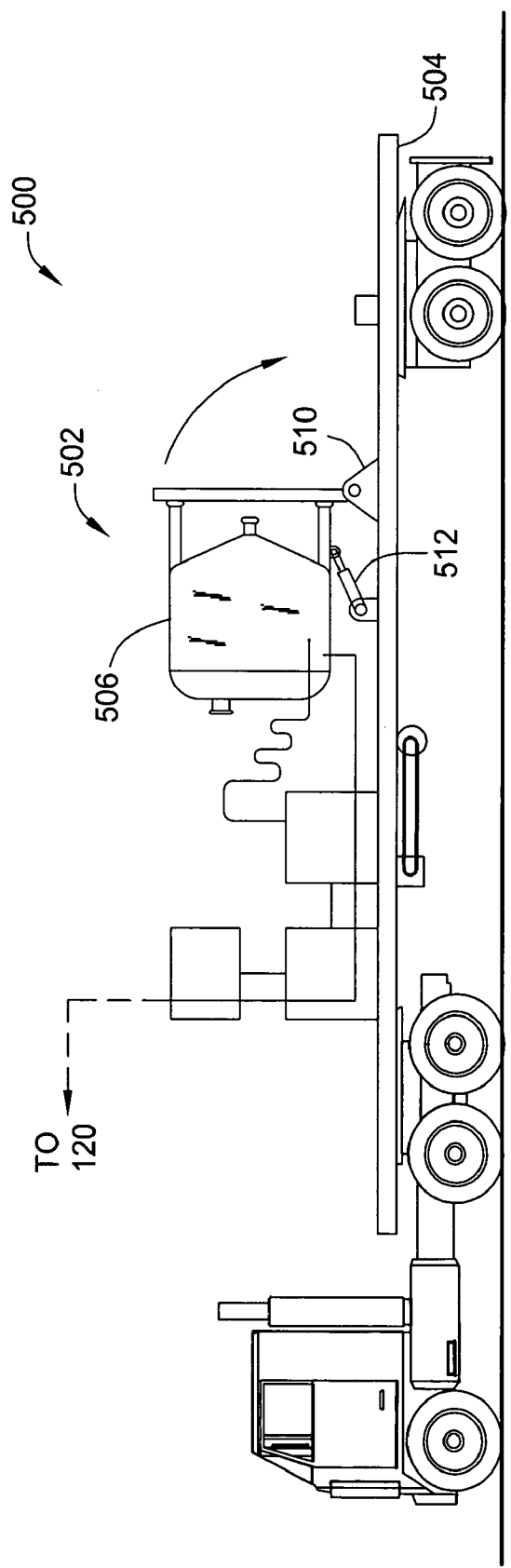
FIGS. 5A-B are side views of another embodiment of a mobile catalyst injection system.
Figure 5B:
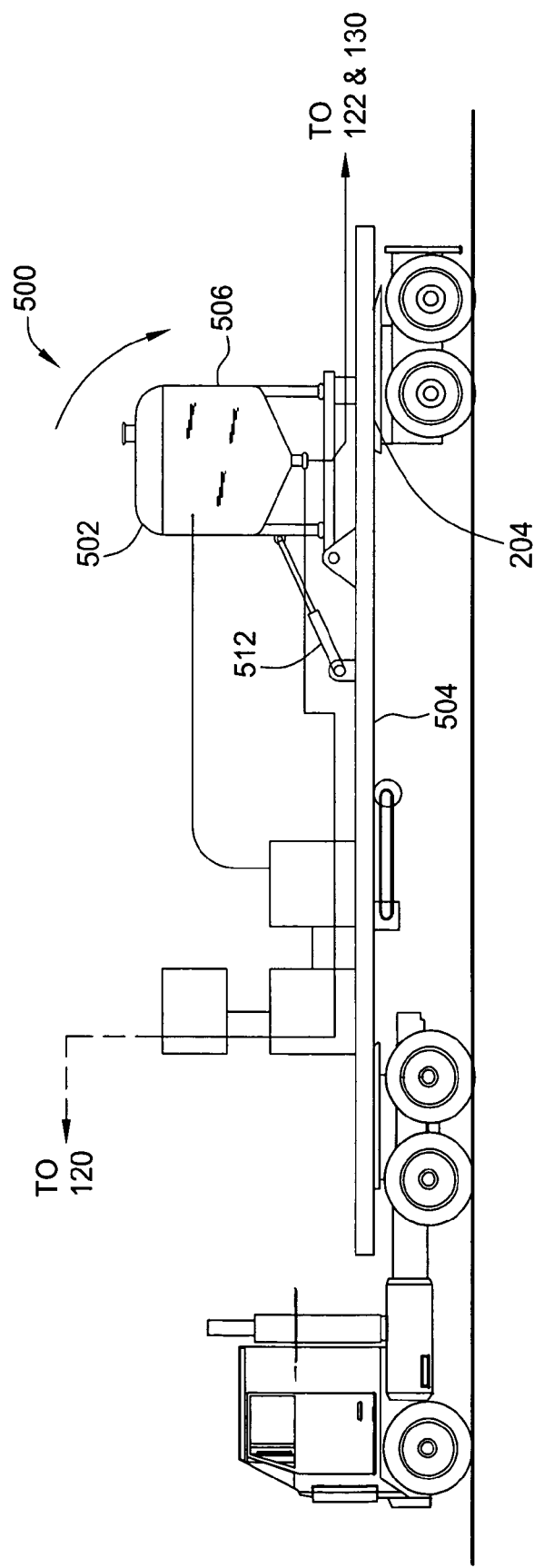

FIGS. 5A-B are side views of another embodiment of a mobile catalyst injection system 500. The mobile catalyst injection system 500 includes a collapsible injection module 502 coupled to a mobile platform 504. The collapsible module 502 has a storage vessel 506 that is configured to move between a collapsed smaller configuration shown in FIG. 5A that facilitates shipment (e.g., has less clearance requirements) and a processing position shown in FIG. 5B, thereby allowing for a larger storage vessel 506 to be utilized as compared to the vessel 410 described above.

The vessel 506 is coupled by a link or hinge 510 to the platform 504. An actuator 512 is coupled between the vessel 506 and platform 504 and is adapted to move the vessel 506 between the collapsed and processing positions. The actuator 512 may be a hydraulic or pneumatic cylinder, a ball screw, a lead screw, a Acme screw, a gear motor or other actuator suitable for changing the orientation of the vessel 506.

Figure 6:
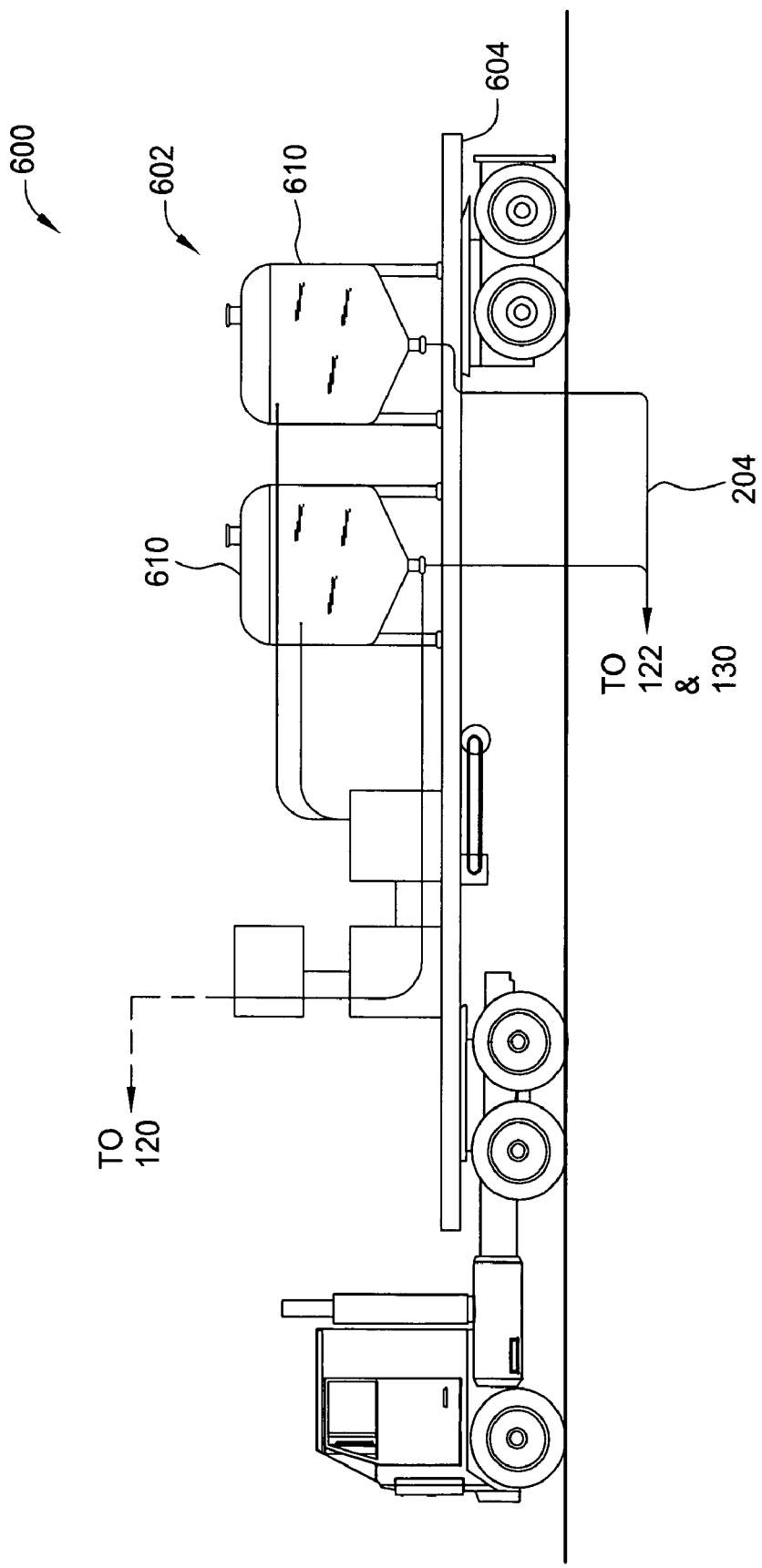
FIG. 6 is a side view of one embodiment of the mobile catalyst injection.

FIG. 6 is another embodiment of a mobile catalyst injection system 600. The mobile catalyst injection system 600 is similar to the systems described above, having an injection module 602 coupled to a single mobile platform 604 with the addition that the injection module 602 includes a plurality of catalyst storage vessels 610. The mobile catalyst injection system 600 advantageously allows two part catalysts, or more than one catalyst for controlling different processing attributes, to be provided by a single injection system, thereby increasing the cost effectiveness of the injection system while further reducing the time required to bring the catalyst system on-line with an existing FCCU.

Figure 7:
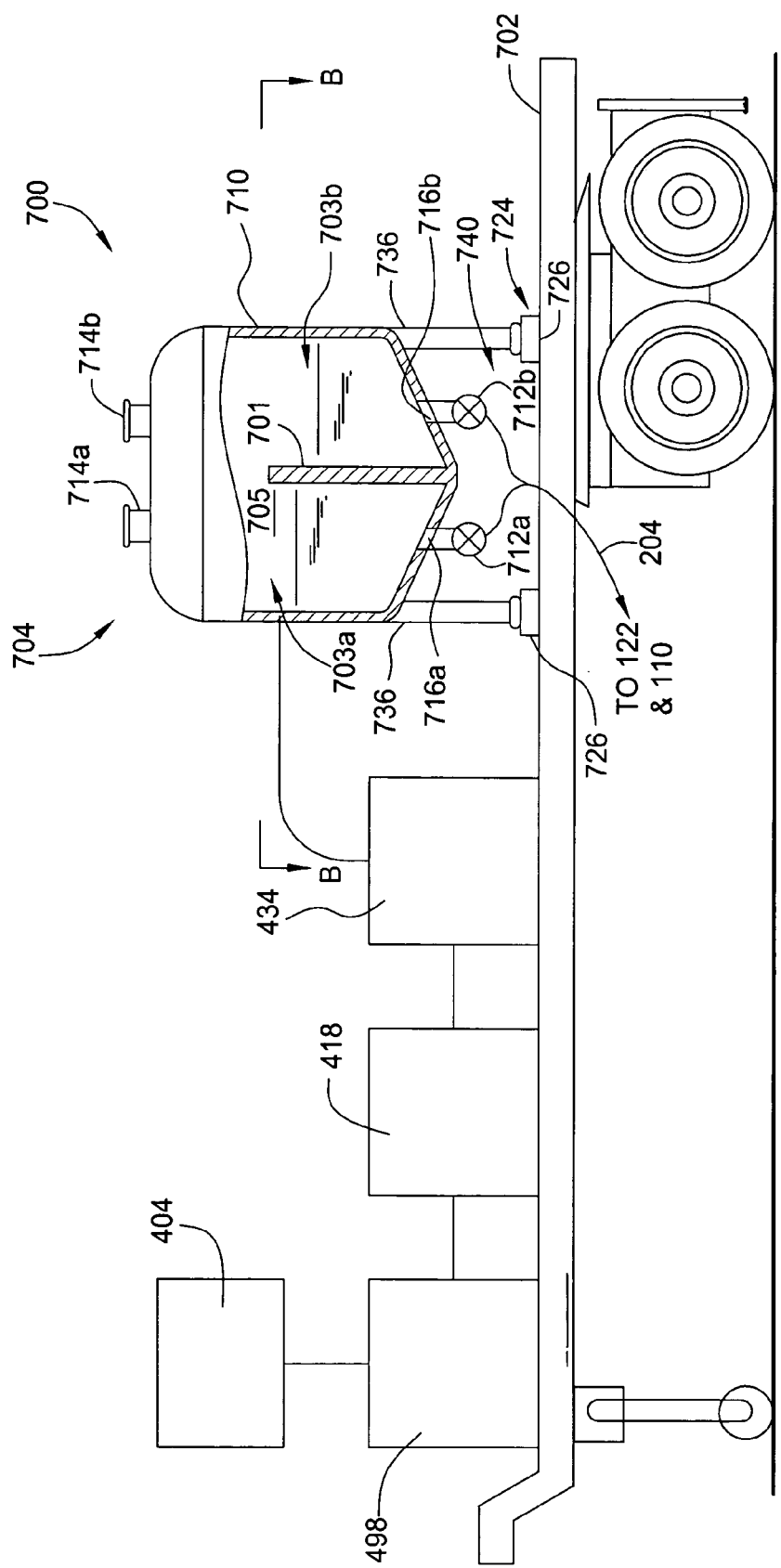
FIG. 7 is a simplified schematic diagram of one embodiment of a mobile multi-catalyst injection system.

FIG. 7 is a simplified schematic diagram of one embodiment of a mobile multi-catalyst injection system 700 that may be utilized at least with the various embodiments of the mobile catalyst injection systems described above. The mobile injection system 700 includes an injection module 704 coupled to a mobile platform 702. The injection module 704 generally includes a vessel 710 suitable for independently storing and dispensing catalyst. It is contemplated that the dispense system may dispense more than one catalyst from the vessel 710 sequentially, simultaneously, or combinations thereof. The storage vessel 710 is coupled by a conduit 204 to the FCC unit 110 to supply and/or replenish catalyst for use in refining the crude oil stock. The ability of the mobile injection system 700 to handle more than one catalyst allows the refiner to utilize multiple catalysts from a single system.

Figure 8:
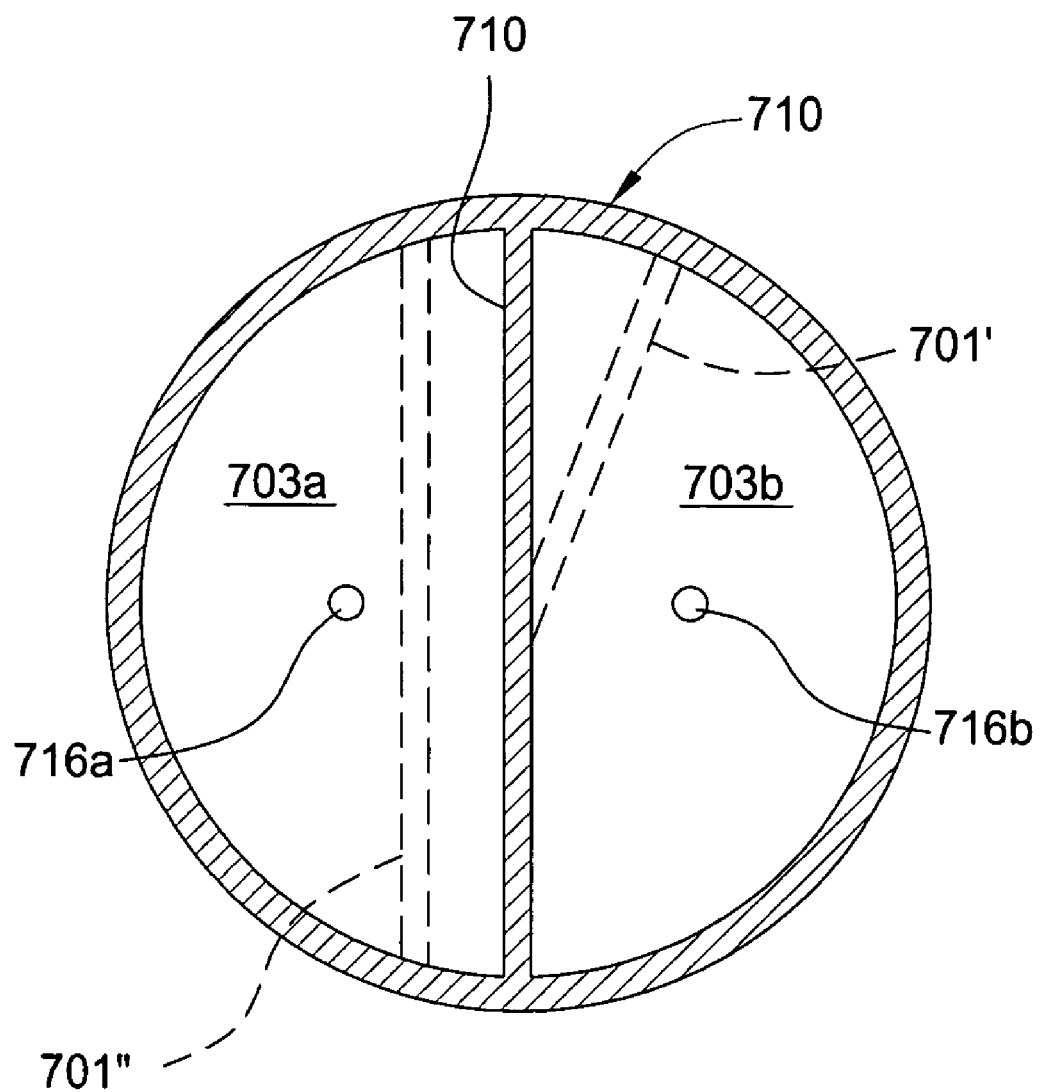
FIG. 8 is a sectional view of the mobile multi-catalyst injection system of FIG. 7.

Referring simultaneously to FIG. 7 and the cross-sectional view of the storage vessel 710 illustrated in FIG. 8, the storage vessel 710 is typically a metal or other suitable container having two or more compartments 703a and 703b (hereinafter collectively referred to as "compartments 703") for individually storing a catalyst. The compartments 703 share a common pressure plenum 705 positioned at the upper end of the vessel 710. Although it is intended that different catalysts will be stored in each compartment 703, it is contemplated that two or more of the compartments 703 may store the same catalyst.

The storage vessel 710 includes two or more fill ports 714a or 714b (hereinafter collectively referred to as "fill ports 714"), two and more discharge ports 716a and 716b (hereinafter referred to as "discharge ports 716"). Each compartment 703 is associated with an associated pair of the discharge and fill ports 716, 714 to isolate the filling, storage and discharge of the catalysts stored in a respective compartment 703 of the vessel 710. Each discharge port 716 is coupled at the bottom of the vessel 710 to a dispense system 740. As discussed above, the dispense system 740 controls the amount of catalyst delivered to the FCC unit 110. In one embodiment, the vessel 710 is suitable for use in elevated pressures.

In one embodiment, the compartments 703 are separated by at least one separator 701. The separator 701 is coupled to the bottom of the vessel 710, separating the discharge ports 716. The separator 701 extends vertically within the interior of the vessel 710. The separator 701 extends vertically within the interior of the vessel 710 and is coupled to the side walls of the vessel 710 to separate the compartments 703. In the embodiment depicted in FIG. 7, the separator 701 does not extend completely to the top of the vessel 710, such that the plenum 705 is free to communicate across the top of the separator 701 between the compartments 703. It is also contemplated that the separator 710 may extend from the bottom to the top of the vessel 710, and may include a plurality of holes (not shown) formed through the separator 701 near the fill ports 714 to allow the plenum 705 to communicate with each of the compartments 703.

In the embodiment illustrated, the separator 701 separates the storage vessel 710 into two separate compartments 703a and 703b, but those skilled in the art will appreciate that the storage vessel 710 may be separated into any number of compartments 703, as will be illustrated further herein. In one embodiment, the separator 701 has a substantially planar shape that is positioned to separate the storage vessel 710 into compartments 703 having substantially equal volumes. In another embodiment, the separator 701 has a "dog-leg" shape that separates the storage vessel 710 into compartments 703 having unequal volumes (indicated by dashed line 701'). In yet another embodiment, the separator 701 has a substantially straight shape, but is positioned slightly off-center within the storage vessel 710 to divide the storage vessel 710 into compartments 703 having unequal volumes (as indicated by dashed line 701"). Configuring the compartments 703 with unequal volume is particularly suitable for use with two-part catalysts that require separate injection at different volumes, and in systems where greater quantity of one catalyst is used relative another, but the total volume of catalyst used make it desirable to share a common injection system.

The dispense system 740 comprises metering devices 712a, 712b (hereinafter referred to as "metering devices 712"), each coupled to a respective discharge port 716. In other words, the dispense system 740 comprises one metering device 712 for each compartment 703 of the storage vessel 710. The metering devices 712 are typically coupled to the control module 404 so that an amount of catalyst delivered to the conduit 204 may be monitored or metered bases on a production plan or in response to a real time need, for example, in response to flag from a process sensor.

The metering device 712 controls the amount of catalyst injected from its associated compartment 703 in the storage vessel 710 to the FCC unit 110. The metering device 712 may be a shut-off valve, a rotary valve, a mass flow controller, a shot pot, a flow sensor, a positive displacement pump or other devices suitable for regulating the amount of catalyst dispensed from the storage vessel 710 for delivery to the conduit 204. The metering device 712 may determine the amount of catalyst by weight, volume, timed dispense or by other manners. In the embodiment depicted in FIG. 7, the metering devices 712 are control valves that regulate the amount of catalyst delivered from the storage vessel 710 into the conduit 204 by a timed actuation.

The control valves are coupled to the conduit 204 between a fluid source 434 and the FCC unit 110. Although the control valves are shown in FIG. 7 as coupled in series on the conduit 204, the control valves may alternatively be coupled in parallel between the fluid source 434 and the FCC unit 110. In one embodiment, the fluid source 434 provides air at about 80 psi (about 5.6 kg/cm$^2$).

A pressure control module 498 controls the pressure within plenum 705 of the storage vessel 710. The pressure control module 498 generally pressurizes the storage vessel 710 to about 5 to about 80 pounds per square inch (about 0.35 to about 5.6 kg/cm$^2$) during dispensing operations. The module 498 intermittently vents the storage vessel 710 to about atmospheric pressure to accommodate recharging the vessel 710 with catalyst.

A control module 404 is coupled to the mobile injection system 700 to control the rates and/or amounts of catalyst that are delivered by the system 700 into the conduit 204. In one embodiment, the control module 404 is coupled to the metering devices 712 so that an amount of catalyst delivered to the conduit 204 may be monitored or metered. One suitable control module is described in U.S. patent application Ser. No. 10/304,670, filed Nov. 26, 2002, which is incorporated by reference herein in its entirety.

In one embodiment, the mobile injection system 700 optionally includes one or more sensors 724 for providing a metric suitable for resolving the amount of catalyst passing through the metering devices 712 during each injection of catalyst. The sensors 724 may be configured similar to the sensors described above.

In the embodiment depicted in FIG. 7, the sensor 724 is a plurality of load cells 726 adapted to provide a metric indicative of the weight of catalyst in the compartments 703 of the storage vessel 710. The load cells 726 are respectively coupled to a plurality of legs 736 that supports the storage vessel 710 above the platform 702. Each of the legs 736 has one load cell 726 coupled thereto. The control module 404 receives the outputs of the load cells 726. From sequential data samples obtained from the load cells 726, the control module 404 may resolve the net amount of injected catalyst after each actuation of the metering device 712. By using the measured changes in total weight of catalyst in the system 710, and assigning these changes to an individual compartment 703 depending on which valve 732 was open when the weight changed, the amount of each catalyst that is dispensed sequentially may be determined.

The operation of the mobile injection system 700 is initiated when the control module 404 determines, for example based on a pre-set injection schedule or on information provided by sensors, the amount of catalyst required by the system 700 to function at optimal efficiency (e.g., the amount of catalyst required to return the system's outputs to within a predefined process window). For example, catalyst additions in response to a sensed output metric may be utilized to maintain the system emissions at an acceptable level or to derive a desired product mix from the feed stock oil.

Based on the control module's determination, at least one particular catalyst suited to address a particular system need (e.g., emissions reduction) may be dispensed from the mobile injection system 700 and released into the conduit 204. In one embodiment, several catalysts are dispensed simultaneously from a single injection system 700 and released into the conduit 204. Thus, the number of total storage vessels 710 for containing catalysts may be reduced, and the mobile injection system 700 may be adapted to operate more efficiently with minimal system modifications. Moreover, the mobile injection system 700 is particularly suitable for efficiently dispensing multi-part catalysts (i.e., catalysts having different parts injected separately into the FCC unit 110).

Figure 9:
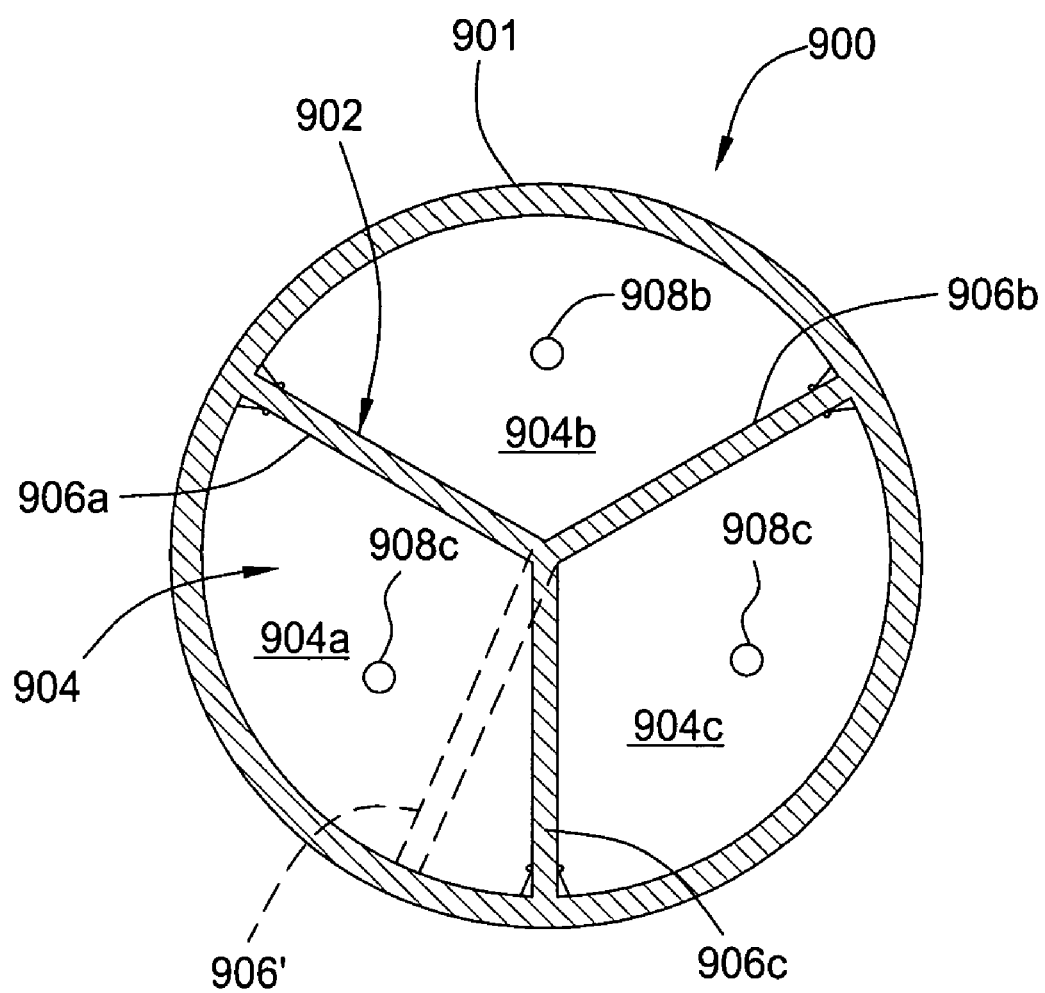
FIG. 9 is a simplified schematic diagram of another embodiment of a mobile multi-catalyst injection system.

FIG. 9 depicts a sectional view of another embodiment of a injection module 900 that is suitable for use in a mobile multi-catalyst injection system such as those described above. The injection module 900 is similar to the module 704 depicted in FIGS. 7 and 8, and comprises a storage vessel 901, a separator 902 and a plurality of compartments. In the embodiment illustrated, the storage vessel 901 is separated into three compartments 904a, 904b and 904c (hereinafter collectively referred to as "compartments 904") by the separator 902. The separator 902 comprises three flanges 906a, 906b and 906c (hereinafter referred to as "flanges 906") that divide the storage vessel 901 into the three compartments 904. Each of the three compartments 904 is further associated with a discharge port 908a, 908b or 908c (hereinafter collectively referred to as "discharge ports 908") formed through the vessel 901 and inlet ports (not shown). In one embodiment, the flanges 906 of the separator 902 are evenly spaced apart to divide the storage vessel 901 into compartments 904 of substantially equal volume. In another embodiment, the flanges 906 are spaced to divide the storage vessel 901 into compartments 904 of different volumes (as indicated by dashed line 906'). Although the separator 902 illustrated in FIG. 9 is depicted as having three flanges 902, those skilled in the art will appreciate that the separator 902 may comprise any number of flanges 902, for dividing the storage vessel 901 into any number of compartments 904 where the ratio of volume between at least two of the compartments 904 may be substantially equal or arranged in predefined volume ratios. Configuring the compartments 904 with unequal volume is particularly suitable for use with two-part catalysts that require separate injection at different volumes, and in systems where greater quantity of one catalyst is used relative another, but the total volume of catalyst used make it desirable to share a common injection system. Moreover, one of the compartments 904 may be kept empty to provide an on-line emergency injection system read for loading catalyst for satisfying unplanned changes in processing requirements, thereby enabling the refiner to quickly take advantage of market conditions or environmental issues, such as changes in emissions due to equipment failure or variation in the composition of oil feed stock.

Figure 10:
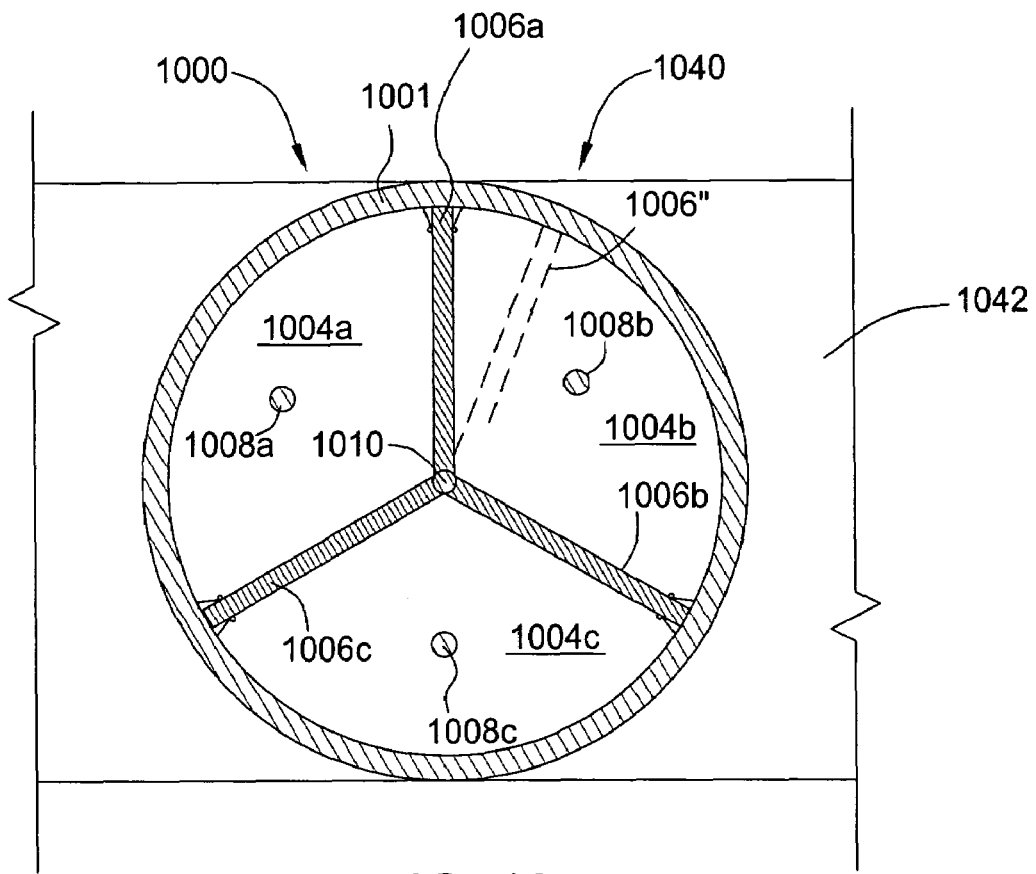
FIG. 10 is a partial sectional view of another embodiment of a mobile multi-catalyst injection system.

FIG. 10 depicts a sectional view of another embodiment of a multi-catalyst injection system 1000. The mobile multi-catalyst injection system 1000 includes an injection module 1040 coupled to a transportable platform 1042. The injection module 1040 is similar to the module 704 described above and comprises a storage vessel 1001, an adjustable separator 1002 and one or more compartments 1004. In the embodiment illustrated, a storage vessel 1001 is separated into three compartments 1004a, 1004b and 1004c (hereinafter collectively referred to as "compartments 1004") by the adjustable separator 1002. Each of the three compartments 1004 is further associated with discharge port 1008a, 1008b or 1008c (hereinafter collectively referred to as "discharge ports 1008") and fill ports (not shown).

The adjustable separator 1002 includes two or more flanges. In the embodiment illustrated, the separator 1010 comprises three flanges 1006a, 1006b and 1006c (hereinafter collectively referred to as "flanges 1006") that divide the storage vessel 1001 into the three compartments 1004. At least two of the flanges 1006 are coupled at a hinge 1010 extending in an axial orientation within the vessel 1001. At least one of the flanges 1006 may be rotated about the hinge 1010 to allow the relative orientation of the flanges 1006 to be repositioned, thereby allowing the volumetric ratio between compartments to be selectively adjusted.

Figure 11:
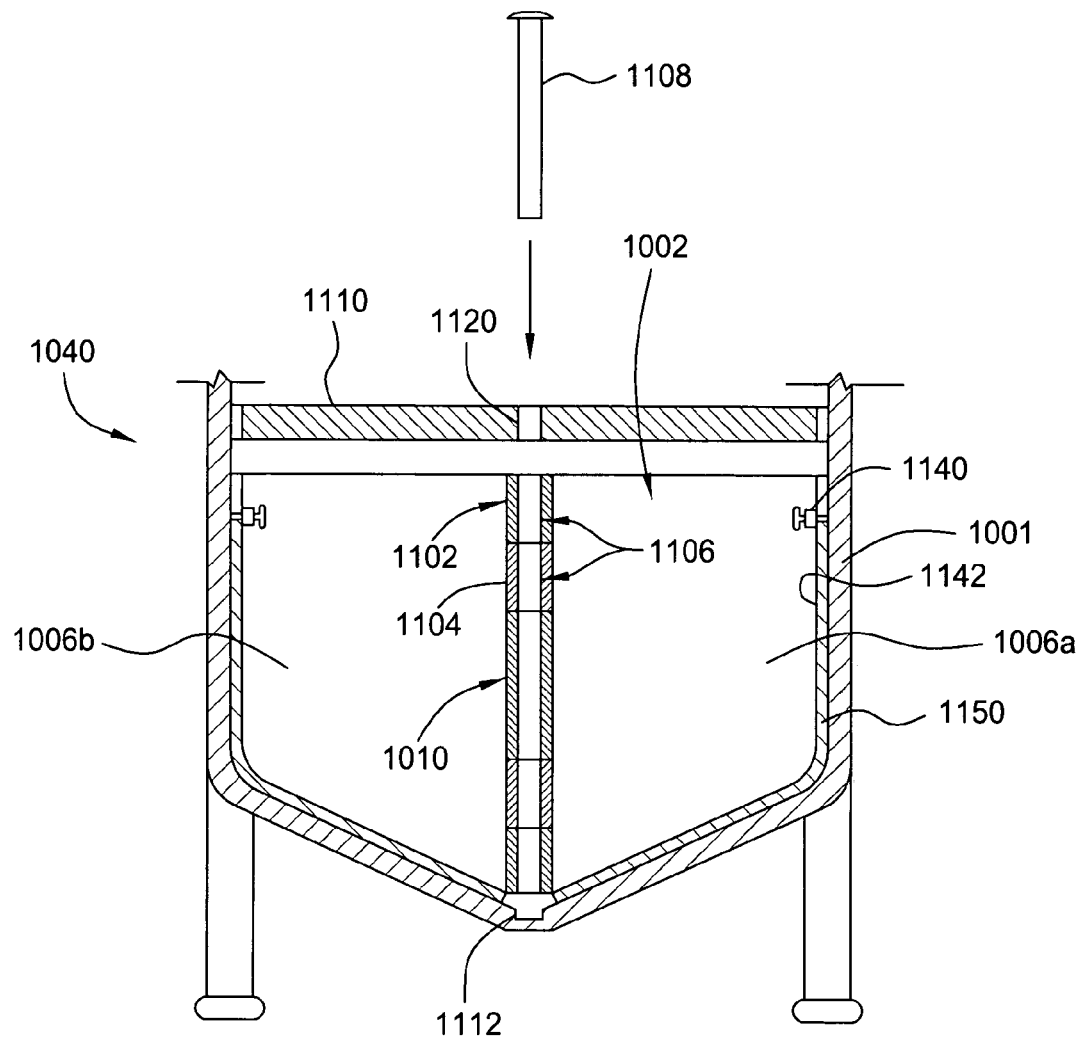
FIG. 11 is a sectional view of one embodiment of a injection module of the mobile multi-catalyst injection system of FIG. 10.

FIG. 11 is a side view of one embodiment of the hinge 1010. The hinge 1010 includes a first element 1102 coupled to a first one of the flanges (506a) and a second element 1104 coupled to a second one of the flanges (506b). The elements 1102, 1104 include a plurality of interleaving apertures 1106 that accept a rod 1108 passing therethrough. The rod 1108 passed through a hole 1120 formed through an upper brace 1110 coupled to the sidewalls of the vessel 1001 and engages a hole 1112 formed in the bottom of the vessel 1001. The brace 1110 and the hole 1112 retain the rod 1108 in an orientation that allows the flanges 1006, retained by the elements 1102, 1104, to freely rotate around the rod 1108.

The movable flanges 1006 are fixed in orientation by a locking mechanism 1140. In one embodiment, one locking mechanism 1140 is coupled to each edge 1142 of the flanges 1006 adjacent the sidewall of the vessel 1001. The locking mechanism 1140 is generally adapted to releasably engage the sidewall of the vessel 1001 in a manner that prevents rotation of the flange 1006. Alternatively, the locking mechanism 1140 may be disposed in another location within the vessel 1001, and configured to secure the relative position of the flanges 1006. For example, a locking mechanism may be configured to bind the hinge 1010 or be in the form of a brace (not shown) disposed between two or more of the flanges.

Figure 12:
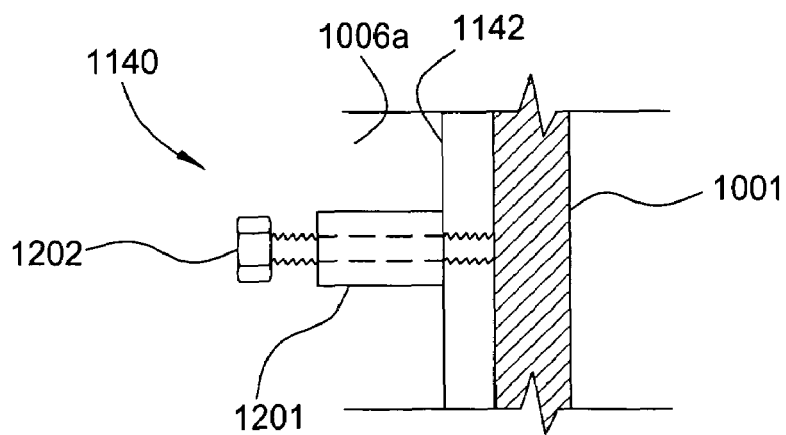
FIG. 12 is a partial sectional view of one embodiment of a locking mechanism of the mobile multi-catalyst injection system of FIG. 10.

FIG. 12 depicts one embodiment of the locking mechanism 1140 that may be utilized to fix the orientation of the flanges 1002 within the vessel 1001. In the embodiment depicted in FIG. 12, the locking mechanism 1140 includes a screw 1202 threaded through a block 1201 affixed to the flange 1006a. The block 1001 may be coupled to the flange 1006a by welding, screwing, riveting, bonding and the like. As the screw 1202 is rotated to extend through the block 1201, the screw 1202 is tightened against the vessel 1001 thereby locking the flange 1006a in a predefined position. It is contemplated that the locking mechanism 1140 may be part of, or interact with the hinge 1010, or may be a clamp, pin or other device suitable for fixing the flange 1006a (or other movable flanges 1006) in a predefined position. Moreover, as the locking mechanism 1140 allows the flanges 1006 to be repositioned, the volumetric ratio between the compartments 1004 may be reconfigured to allow greater flexibility in choice of catalysts utilized in the system 1000.

Referring back to FIG. 11, each of the movable flanges 1006 includes a seal 1150 that minimizes and/or eliminates catalyst cross contamination between compartments 1004. The seal 1150 is configured to interface between the each flange 1006 and the sidewalls of the vessel 1001. The seal 1150 may be any device suitable for preventing catalyst from passing between the flange 1006 and the vessel 1001. Examples of suitable seals 1020 include gaskets and brushes. The seal 1150 may be disposed on one or both sides of the flanges 1006.

Figure 13:
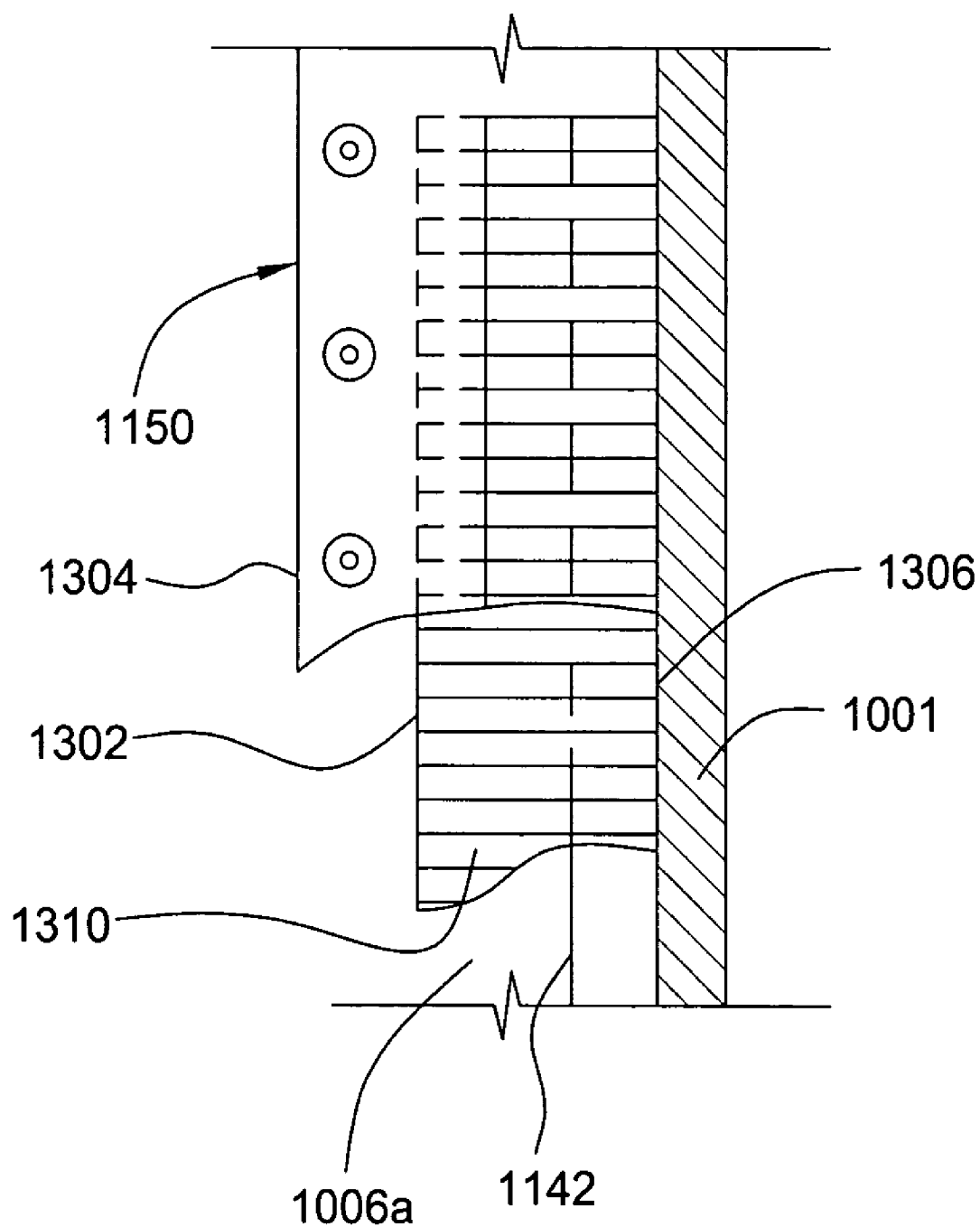
FIG. 13 is a partial sectional view of one embodiment of a seal of the mobile multi-catalyst injection system of FIG. 10.

Referring additionally to the partial sectional view of FIG. 13, the seal 1150 is generally includes a sealing element 1310 coupled at a first edge 1302 to a mounting flange 1304. The mounting flange 1304 is coupled to the flange 1006a in a position that allows a second edge 1306 of the seal 1150 to extend beyond the edge 1142 of the flange 1006 and engage the walls of the vessel 1001. The second edge 1306 of the seal 1150 is generally configured to allow the flange 1006 to move relative the vessel 1001 while substantially preventing catalyst from passing between compartments through the gap defined between the edge 1142 of the flange 1006 and the vessel 1001. In the embodiment depicted in FIG. 13, the seal 1150 is a brush having its first edge 1302 crimped or otherwise fixed in the mounting flange 1304. The mounting flange 1304 is riveted or otherwise secured to the flange 1006. Although not shown in FIG. 13, it is contemplated that the seal 1150 extends substantially along the entire edge of the flange 1006 disposed adjacent the walls and bottom of the vessel 1001.

Thus, the flanges 1006 of the separator 1002 may be evenly spaced apart as illustrated to divide the storage vessel 1001 into compartments 1004 of substantially equal volume, or the flanges 1006 may be moved to spacing to divide the storage vessel 1001 into at least two compartments 1004 of different volumes. Although the separator 1002 illustrated in FIG. 10 is depicted as having three movable flanges 1002, those skilled in the art will appreciate that the separator 1002 may comprise any number of movable flanges 1002, for dividing the storage vessel 1001 into any number of compartments 1004.

Thus, the present invention represents a significant advancement in the field of fluid catalytic cracking systems. A mobile injection system having a storage vessel for process catalysts that is capable of dispensing two or more catalysts, either separately or simultaneously, from a single system is highly advantageous. Moreover, as the mobile injection system may be quickly brought on-line with a running FCCU, fast and efficient process flexibility enhanced.

While foregoing is directed to the preferred embodiment of the present invention, other and further embodiments of the invention may be devised without departing from the basic scope thereof, and the scope thereof is determined by the claims that follow.

What is claimed is:

1. A mobile catalyst injection system comprising:
   a transportable platform;
   a catalyst reservoir coupled to the platform and configured to be coupled to an fluid catalyst cracking unit; and
   a flow control device coupled to an outlet of the reservoir, wherein the flow control device is adapted to control the flow of catalyst through the outlet directly to the fluid catalyst cracking unit;
   a process controller coupled to the platform and flow control device for dispensing a metered amount of catalyst from the catalyst reservoir suitable for process control in the fluid catalyst cracking unit;
   a pressure control system coupled to the platform and the catalyst reservoir for controlling pressure within the catalyst reservoir; and
   wherein the transportable platform, catalyst reservoir, process controller, pressure control system and flow control device comprise a self contained mobile injection system.

2. The system of claim 1, wherein the platform is a trailer.

3. The system of claim 1, wherein the platform is a container.

4. The system of claim 1, wherein the platform is a railroad car.

5. The system of claim 1, wherein the platform is a pallet.

6. The system of claim 1, wherein the platform is a barge.

7. The system of claim 1 further comprising:
   a generator coupled to the platform.

8. The system of claim 1, wherein the catalyst reservoir is movable relative to the platform.

9. The system of claim 1 further comprising a plurality of load cells disposed between the catalyst reservoir and the platform.

10. The system of claim 1 further comprising sensor adapted to detect a metric indicative of catalyst dispensed from the catalyst reservoir.

11. The system of claim 1, wherein the catalyst reservoir further comprises:
    a plurality of compartments; and
    a plenum disposed in the catalyst reservoir and coupling the compartments.

12. The system of claim 11, wherein at least two of the plurality of compartments are substantially equal in volume.

13. The system of claim 11, wherein at least two of the plurality of compartments are substantially unequal in volume.

14. The system of claim 11, wherein at least one of the plurality of compartments has an adjustable volume.

15. The system of claim 1 further comprising a second catalyst reservoir coupled to the platform and adapted to be coupled to the fluid catalyst cracking unit.

16. A mobile catalyst injection system comprising:
    a trailer;
    a catalyst reservoir coupled to the trailer and configured to be coupled to an fluid catalyst cracking unit;
    a pressure control system coupled to the trailer and catalyst reservoir;
    a flow control device coupled to an outlet of the reservoir, wherein the flow control device is suitable for process control in the fluid catalyst cracking unit and adapted to control the flow of a metered amount of catalyst through the outlet directly to the fluid catalyst cracking unit; and wherein the trailer, catalyst reservoir, and flow control device comprise a self contained mobile injection system.

17. The system of claim 16, wherein the catalyst reservoir further comprises:
a plurality of compartments; and
a plenum disposed in the catalyst reservoir and coupling the compartments.

18. The system of claim 17, wherein at least one of the plurality of compartments has an adjustable volume.

19. The system of claim 16 further comprising:
a second catalyst reservoir coupled to the trailer and pressure control system.

20. A mobile catalyst injection system comprising:
a container;
a catalyst reservoir coupled to the container and adapted to be coupled to an fluid catalyst cracking unit;
a pressure control system coupled to the container and catalyst reservoir; and
a flow control device coupled to an outlet of the reservoir, wherein the flow control device is suitable for process control in the fluid catalyst cracking unit and adapted to control the flow of a metered amount of catalyst through the outlet directly to the fluid catalyst cracking unit; and
wherein the container, catalyst reservoir, and flow control device comprise a self contained mobile injection system.

21. The system of claim 20, wherein the catalyst reservoir further comprises:
a plurality of compartments; and
a plenum disposed in the catalyst reservoir and coupling the compartments.

22. The system of claim 21, wherein at least one of the plurality of compartments has an adjustable volume.

23. The system of claim 20 further comprising:
a second catalyst reservoir coupled to the container and pressure control system.

24. A method for process control in a fluid catalytic cracking system, comprising:
processing oil in a fluid catalytic cracking system having a one or more hard piped catalytic injection systems;
transporting a self contained mobile catalyst injection system to the fluid catalytic cracking system;
directly coupling the mobile catalyst injection system to the fluid catalytic cracking system; and
injecting a metered amount of catalyst from the mobile catalyst injection system into the fluid catalytic cracking system for process control in the fluid catalyst cracking unit.

25. The method of claim 24, wherein the step of transporting further comprises moving the mobile catalyst injection system by at least one of road, land, sea or air.

26. The method of claim 24 further comprising:
identifying a need for a catalyst needed in addition to catalysts being dispensed by the one or more hard piped catalytic injection systems.

27. The method of claim 26, wherein the step of transporting is in response to the identified need.

28. The method of claim 27, wherein the step of injecting occurs within at least 1 hour after the completion of the transporting step.

29. The method of claim 24 further comprising:
storing catalyst in a first compartment of the mobile catalyst injection system; and
storing catalyst in a second compartment of the mobile catalyst injection system.

30. The method of claim 29 further comprising adjusting a ratio of volume between the first and second compartments.

31. The method of claim 29 further comprising pressurizing a plenum common to the first and second compartments.

32. The method of claim 29, wherein the step of injecting further comprises:
dispensing at least two catalysts simultaneously from the two respective compartments.

33. The method of claim 29, wherein the step of injecting further comprises:
dispensing at least two catalysts sequentially from the two respective compartments.

34. The system of claim 16, further comprising a generator coupled to the pressure control system.

35. The system of claim 20, further comprising a generator coupled to the pressure control system.

* * * * *